UNITED STATES PATENT OFFICE.

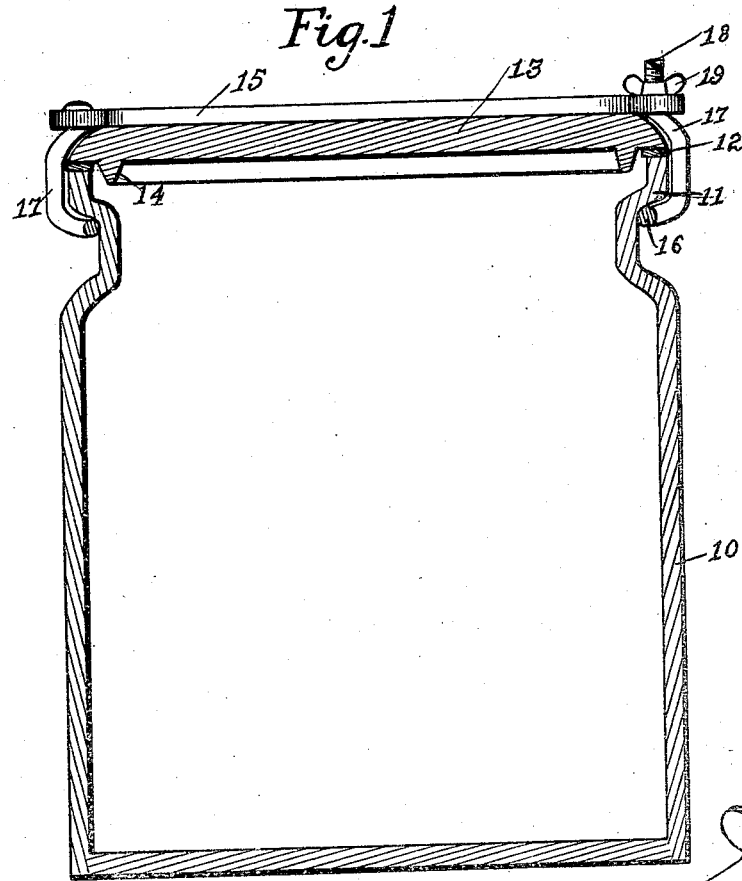
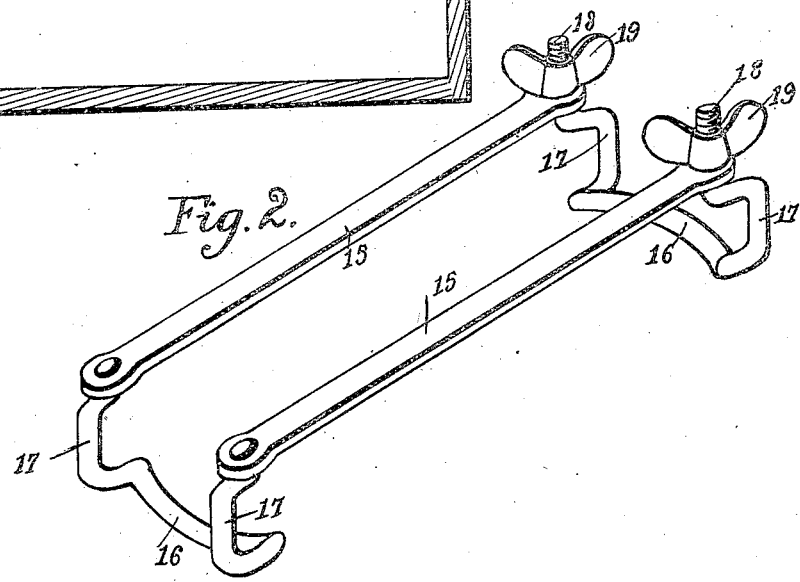

BENJAMIN F. WILSON, OF KNOXVILLE, IOWA.

JAR-CLOSURE.

934,868.  Specification of Letters Patent.  Patented Sept. 21, 1909.

Application filed June 26, 1909. Serial No. 504,514.

*To all whom it may concern:*

Be it known that I, BENJAMIN F. WILSON, a citizen of the United States, residing at Knoxville, in the county of Marion and State of Iowa, have invented a certain new and useful Jar-Closure, of which the following is a specification.

The object of my invention is to provide a device of simple, durable, and inexpensive construction, that may be applied to jars for the purpose of holding the cover of the jar firmly in position against the jar for sealing the jar and forming an air tight joint between the jar and the cover without the use of any lugs or fastening devices of any kind formed on the jar cover.

My invention consists in the construction, arrangement, and combination of the various parts of the device, whereby the objects contemplated are attained, as hereinafter more fully set forth, pointed out in my claim, and illustrated in the accompanying drawings, in which—

Figure 1 shows a sectional view of a jar having my improved closure applied thereto, and Fig. 2 shows a perspective view of a jar-closing device embodying my invention.

Referring to the accompanying drawings, I have used the reference numeral 10 to indicate a jar of ordinary construction having a shoulder 11 near its top. On top of the jar is a rubber gasket 12 of ordinary construction. The jar cover is indicated by the numeral 13 and is provided with a downwardly projecting annular rim 14.

The particular construction of the jar and cover is not material and comprises no part of my invention. It is illustrated and described herein for the purpose of showing that it is not necessary to have any lugs or other devices permanently secured to the cover for the purpose of co-acting with my improved jar closing device.

The jar closing device comprises two flat bars 15 of a length to extend across the top of the jar cover. At one end of these bars is a jar engaging device formed of a single piece of wire and comprising a segmental central portion 16 designed to fit against the exterior of the jar below the shoulder 11 thereof and having at its ends, two upward extensions 17 designed to pass around the top of a jar and over the cover thereof, and having their upper ends pivoted to the bars 15. At the other end of the bars 15 is a corresponding jar engaging device comprising a segmental portion 16 and upwardly projecting end portions 17. The ends thereof instead of being pivoted to the bars 15 are extended through openings in said bars and are screw threaded at 18, and winged nuts 19 are placed thereon.

In practical use, the device is placed on a jar with the bars 15 extended across the cover and the curved portions 16 engaging the exterior of the jar below the shoulder 11. Then by adjusting the nuts 19, the jar engaging device is forced upwardly against the shoulder 11 and the bars 15 are forced downwardly upon the cover. It is obvious that by having two bars 15 extended across the cover in substantially parallel positions, they both stand on opposite sides of the center of the cover and, therefore, they can not be removed from the cover until the nuts 19 are released. In adjusting the device to a jar, the operator may, when necessary, release one end of the jar engaging device from its bar and swing said end outwardly. Then the device may be placed on the jar and the end of the part 17 may be extended through the opening in the bar 15 and then the nut 19 applied on the end of the bar.

It is obvious that the device is of very inexpensive construction and simple in operation, and that when once applied, it will hold the cover to the jar in such a manner as to form an air tight joint. Furthermore, the cover may be readily and easily removed at any time by manipulating the winged nuts.

I contemplate making the device of various sizes and shapes to fit jars and covers of different sizes.

I claim as my invention.

An improved jar closure, comprising two bars, a jar engaging device at one end thereof comprising a segmental central portion and two upwardly extended ends, both being pivoted to the adjacent end of said bars, and a second jar engaging device at the other end of the bars comprising a segmental central portion and two upright portions extended through the bars and screw-threaded at their upper ends, and winged nuts on said screw-threaded ends to engage the bars, substantially as and for the purposes stated.

Des Moines, Iowa, May 31, 1909.

BENJAMIN F. WILSON.

Witnesses:
 G. L. BOYDSTON,
 FRANK L. AVERY.